(12) United States Patent
Archer et al.

(10) Patent No.: US 7,673,011 B2
(45) Date of Patent: Mar. 2, 2010

(54) CONFIGURING COMPUTE NODES OF A PARALLEL COMPUTER IN AN OPERATIONAL GROUP INTO A PLURALITY OF INDEPENDENT NON-OVERLAPPING COLLECTIVE NETWORKS

(75) Inventors: Charles J. Archer, Rochester, MN (US); Todd A. Inglett, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 11/837,015

(22) Filed: Aug. 10, 2007

(65) Prior Publication Data
US 2009/0043988 A1 Feb. 12, 2009

(51) Int. Cl.
G06F 15/167 (2006.01)
G06F 15/16 (2006.01)
G06F 15/76 (2006.01)
(52) U.S. Cl. .................. 709/213; 709/252; 712/13; 712/29; 712/31
(58) Field of Classification Search ......... 709/213–216, 709/252; 712/13, 29, 31
See application file for complete search history.

(56) References Cited

U.S. PATENT DOCUMENTS 4,910,669 A * 3/1990 Gorin et al. ............... 712/17
6,047,122 A * 4/2000 Spiller ...................... 718/108

OTHER PUBLICATIONS

Chan, Ernie et al. "Collective Communication on Architectures that Support Simultaneous Communication over Multiple Links", PPoPP'06, Mar. 29-31, 2006, New York, New York, USA, pp. 2-11.*

Mao, Weizhen et al. "One-To-All Personalized Communication in Torus Networks", Proceedings of the 25th IASTED International Multi-Conference: parallel and distributed computing and networks, Innsbruck, Austria, 2007, pp. 291-296.*

Almasi, George et al. "Optimization of MPI Collective Communication on BlueGene/L Systems", ICS'05, Jun. 20-22, 2005, Boston, MA, USA, 2005, pp. 253-262.*

* cited by examiner

*Primary Examiner*—George C Neurauter, Jr.
(74) *Attorney, Agent, or Firm*—Biggers & Ohanian, LLP

(57) ABSTRACT

Methods, apparatus, and products are disclosed for configuring compute nodes of a parallel computer in an operational group into a plurality of independent non-overlapping collective networks, the compute nodes in the operational group connected together for data communications through a global combining network, that include: partitioning the compute nodes in the operational group into a plurality of non-overlapping subgroups; designating one compute node from each of the non-overlapping subgroups as a master node; and assigning, to the compute nodes in each of the non-overlapping subgroups, class routing instructions that organize the compute nodes in that non-overlapping subgroup as a collective network such that the master node is a physical root.

18 Claims, 8 Drawing Sheets

CONFIGURING COMPUTE NODES OF A PARALLEL COMPUTER IN AN OPERATIONAL GROUP INTO A PLURALITY OF INDEPENDENT NON-OVERLAPPING COLLECTIVE NETWORKS

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for configuring compute nodes of a parallel computer in an operational group into a plurality of independent non-overlapping collective networks.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations in which all compute nodes participate simultaneously, such as, for example, an allgather operation. An allgather operation is a collective operation on an operational group of compute nodes that concatenates segments of data stored on each compute node in rank order and provides the entire concatenation results to all of the compute nodes in the operational group.

The set of compute nodes in a parallel computer upon which collective operations execute is referred to as an operational group. An operational group may be implemented as, for example, a 'communicator' described in the Message Passing Interface ('MPI') specifications promulgated by the MPI Forum. Although collective operations are typically performed on the entire operational group, parallel application designers often perform collective operations on a subset of compute nodes in the operational group. Because the tree network in the current art only supports one collective operation at any given moment, when collective operations execute on multiple subsets of compute nodes in the operational group, the collective operations are typically performed using the torus network. As mentioned above, the torus network lends itself to point to point operations, and it typically inefficient for collective operations. As such, readers will appreciate any improvements that configure compute nodes of a parallel computer in an operational group into a plurality of independent non-overlapping collective networks.

SUMMARY OF THE INVENTION

Methods, apparatus, and products are disclosed for configuring compute nodes of a parallel computer in an operational group into a plurality of independent non-overlapping collective networks, the compute nodes in the operational group connected together for data communications through a global combining network, that include: partitioning the compute nodes in the operational group into a plurality of non-overlapping subgroups; designating one compute node from each of the non-overlapping subgroups as a master node; and assigning, to the compute nodes in each of the non-overlapping subgroups, class routing instructions that organize the compute nodes in that non-overlapping subgroup as a collective network such that the master node is a physical root.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
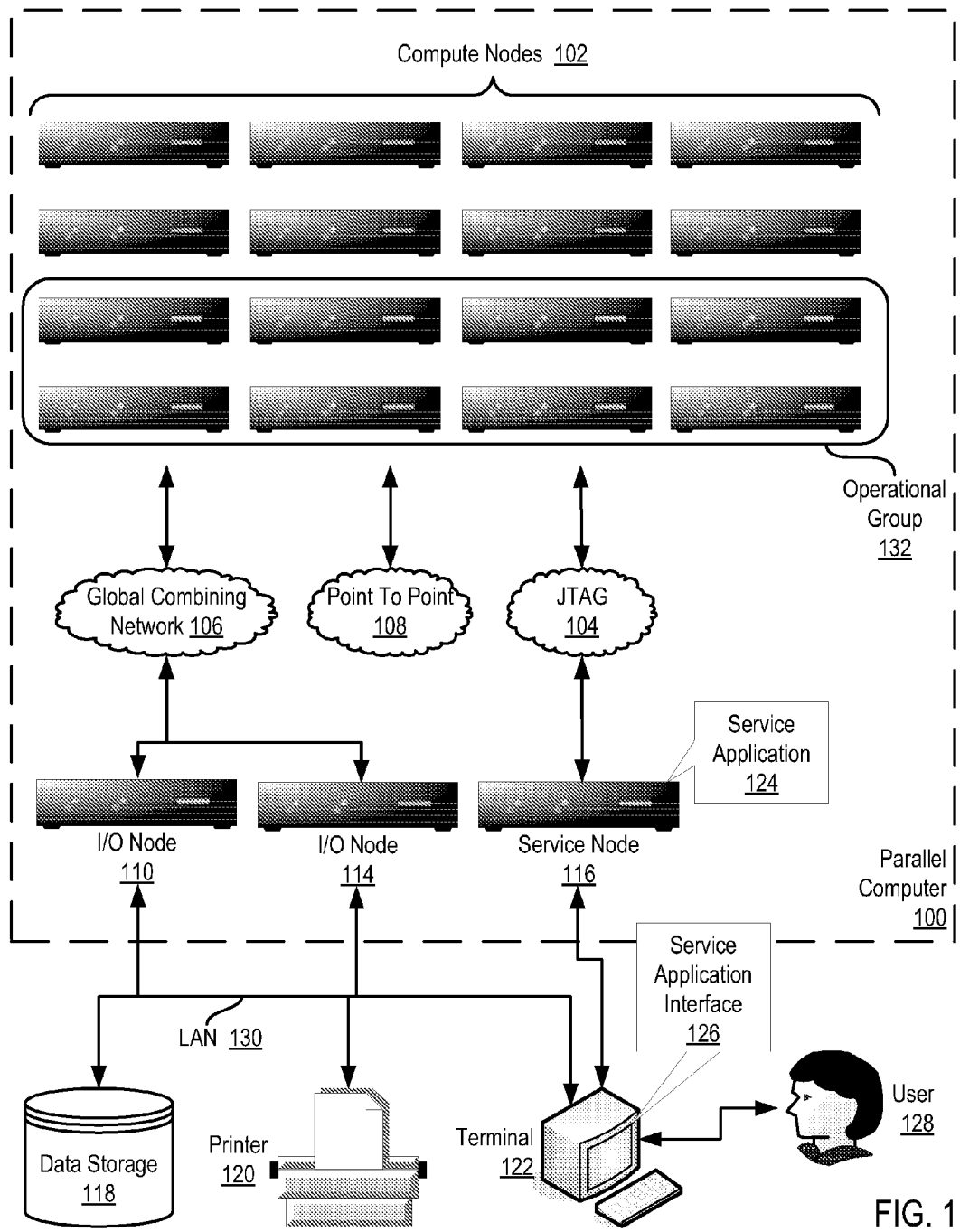
FIG. 1 illustrates an exemplary parallel computer for configuring compute nodes of the parallel computer in an operational group into a plurality of independent non-overlapping collective networks according to embodiments of the present invention.

Exemplary methods, apparatus, and computer program products for configuring compute nodes of a parallel computer in an operational group into a plurality of independent non-overlapping collective networks according to embodiments of the present invention are described with reference to the accompanying drawings, beginning with FIG. 1. FIG. 1 illustrates an exemplary parallel computer for configuring compute nodes in an operational group into a plurality of independent non-overlapping collective networks according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the service application (124) on the service node (116) in FIG. 1 includes computer program instructions for configuring compute nodes of the parallel computer (100) in an operational group (132) into a plurality of independent non-overlapping collective networks according to embodiments of the present invention. As mentioned above, the compute nodes in the operational group (132) are connected together for data communications through the global combining network (106). The service application (124) on the service node (116) in FIG. 1 may operate generally for configuring compute nodes of the parallel computer (100) in an operational group (132) into a plurality of independent non-overlapping collective networks according to embodiments of the present invention by: partitioning the compute nodes in the operational group (132) into a plurality of non-overlapping subgroups; designating one compute node from each of the non-overlapping subgroups as a master node; and assigning, to the compute nodes in each of the non-overlapping subgroups, class routing instructions that organize the compute nodes in that non-overlapping subgroup as a collective network such that the master node is a physical root.

The arrangement of nodes, networks, and I/O devices making up the exemplary system illustrated in FIG. 1 are for explanation only, not for limitation of the present invention. Data processing systems capable of configuring compute nodes of a parallel computer in an operational group into a plurality of independent non-overlapping collective networks according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Configuring compute nodes of a parallel computer in an operational group into a plurality of independent non-overlapping collective networks according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of configuring compute nodes in an operational group into a plurality of independent non-overlapping collective networks according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
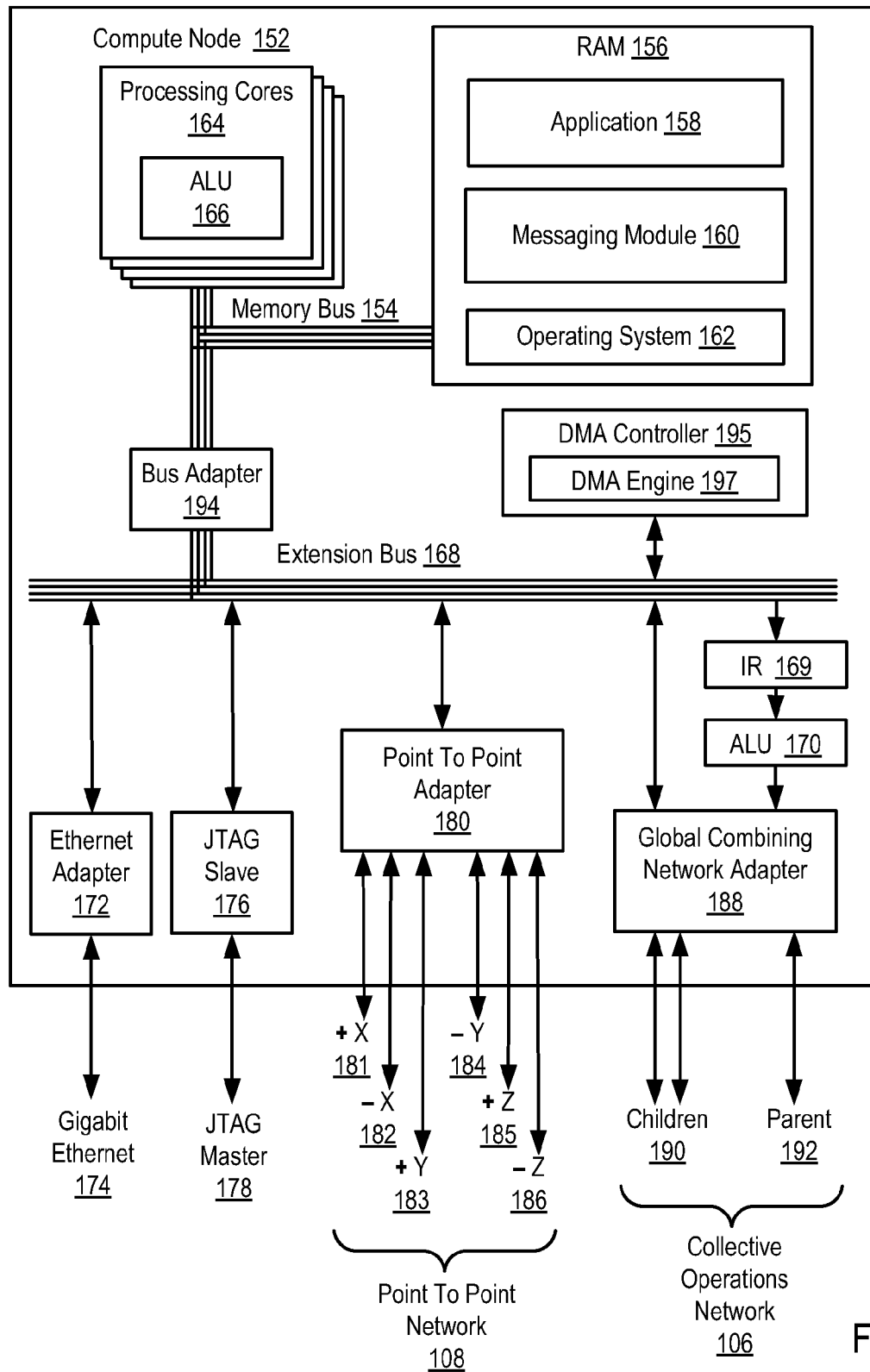
FIG. 2 sets forth a block diagram of an exemplary compute node useful in a parallel computer capable of configuring compute nodes of the parallel computer in an operational group into a plurality of independent non-overlapping collective networks according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for configuring compute nodes of a parallel computer in an operational group into a plurality of independent non-overlapping collective networks according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in configuring compute nodes of a parallel computer in an operational group into a plurality of independent non-overlapping collective networks according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the compute node (152) of FIG. 2 is useful in a parallel computer capable of configuring compute nodes in an operational group into a plurality of independent non-overlapping collective networks according to embodiments of the present invention. Such a parallel computer according to embodiments of the present invention includes compute nodes in an operational group that are connected together for data communications through a global combining network. The parallel computer operates generally for configuring the compute nodes in the operational group into a plurality of independent non-overlapping collective networks according to embodiments of the present invention by: partitioning the compute nodes in the operational group into a plurality of non-overlapping subgroups; designating one compute node from each of the non-overlapping subgroups as a master node; and assigning, to the compute nodes in each of the non-overlapping subgroups, class routing instructions that organize the compute nodes in that non-overlapping subgroup as a collective network such that the master node is a physical root.

Figure 3A:
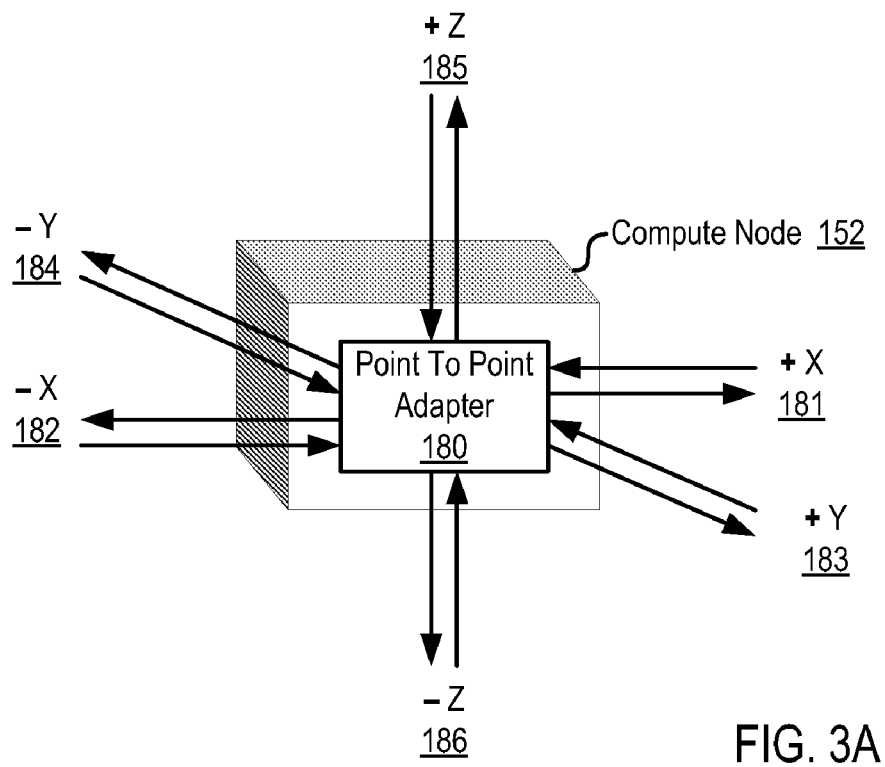
FIG. 3A illustrates an exemplary Point To Point Adapter useful in a parallel computer capable of configuring compute nodes of the parallel computer in an operational group into a plurality of independent non-overlapping collective networks according to embodiments of the present invention.

For further explanation, FIG. 3A illustrates an exemplary Point To Point Adapter (180) useful in a parallel computer capable of configuring compute nodes in an operational group into a plurality of independent non-overlapping collective networks according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
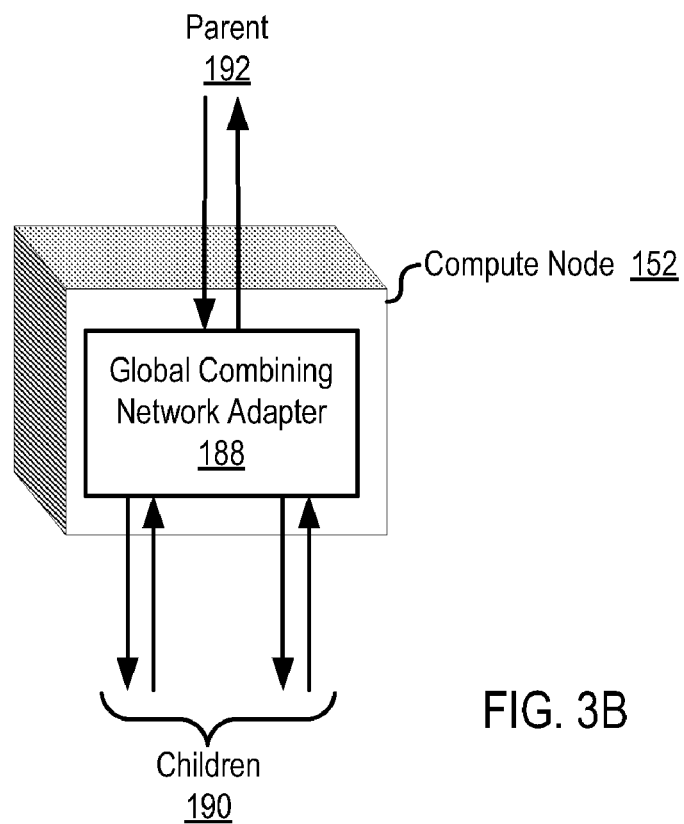
FIG. 3B illustrates an exemplary Global Combining Network Adapter useful in a parallel computer capable of configuring compute nodes of the parallel computer in an operational group into a plurality of independent non-overlapping collective networks according to embodiments of the present invention.

For further explanation, FIG. 3B illustrates an exemplary Global Combining Network Adapter (188) useful in a parallel computer capable of configuring compute nodes in an operational group into a plurality of independent non-overlapping collective networks according to embodiments of the present invention. Global Combining Network Adapter (188) is designed for use in a network optimized for collective operations, in particular a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192). Routing functionality within the Global Combining Network Adapter (188) is controlled by routing instructions stored in routing registers within the adapter (188).

Figure 4:
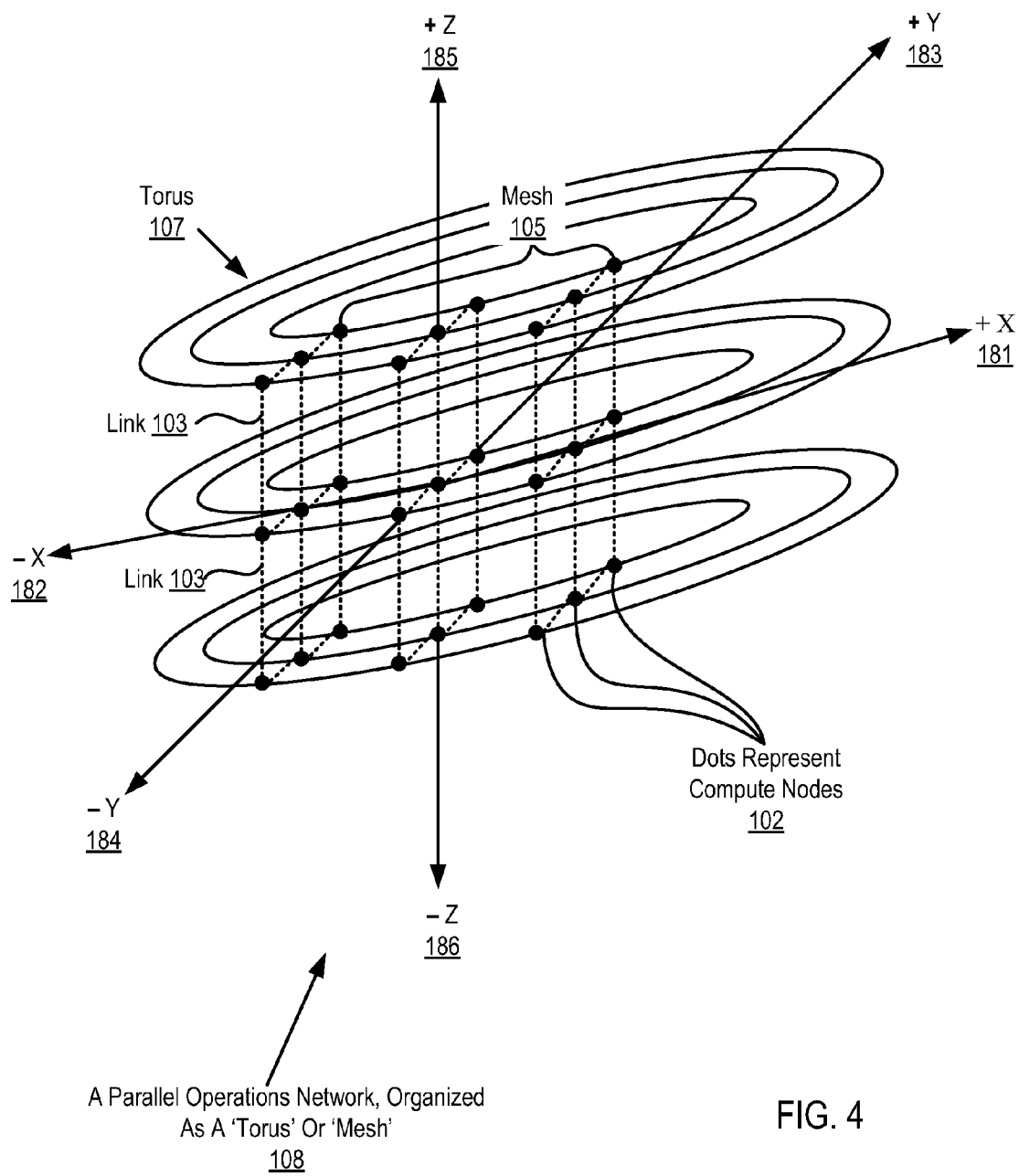
FIG. 4 sets forth a line drawing illustrating an exemplary data communications network optimized for point to point operations useful in a parallel computer capable of configuring compute nodes of the parallel computer in an operational group into a plurality of independent non-overlapping collective networks according to embodiments of the present invention.

For further explanation, FIG. 4 sets forth a line drawing illustrating an exemplary data communications network (108) optimized for point to point operations useful in a parallel computer capable of configuring compute nodes in an operational group into a plurality of independent non-overlapping collective networks in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in configuring compute nodes of a parallel computer in an operational group into a plurality of independent non-overlapping collective networks in accordance with embodiments of the present invention may contain only a few compute nodes or may contain thousands of compute nodes.

Figure 5:
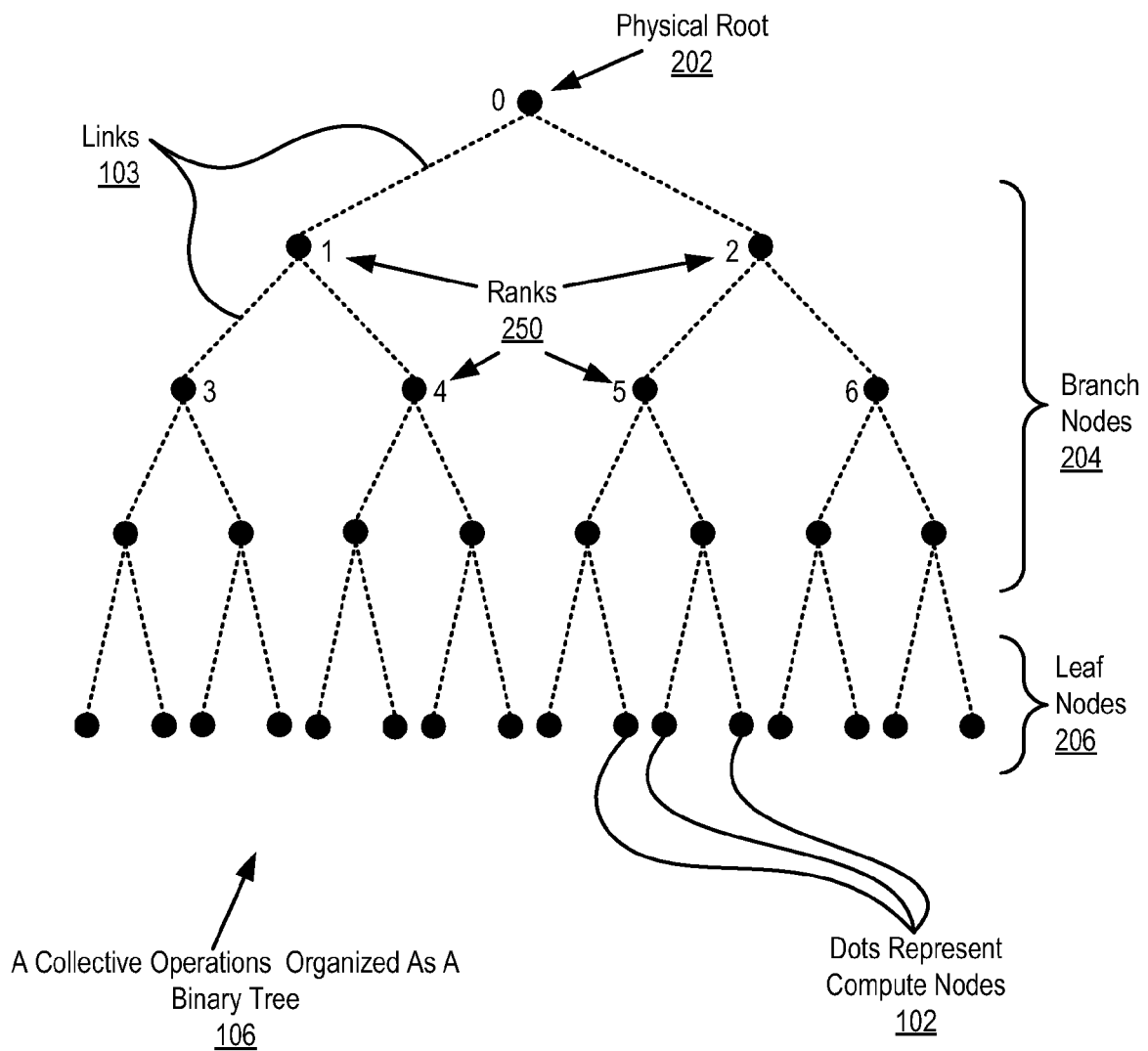
FIG. 5 sets forth a line drawing illustrating an exemplary data communications network optimized for collective operations useful in a parallel computer capable of configuring compute nodes of the parallel computer in an operational group into a plurality of independent non-overlapping collective networks according to embodiments of the present invention.

For further explanation, FIG. 5 sets forth a line drawing illustrating an exemplary data communications network (106) optimized for collective operations useful in a parallel computer capable of configuring compute nodes of a parallel computer in an operational group into a plurality of independent non-overlapping collective networks in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for configuring compute nodes in an operational group into a plurality of independent non-overlapping collective networks accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6A:
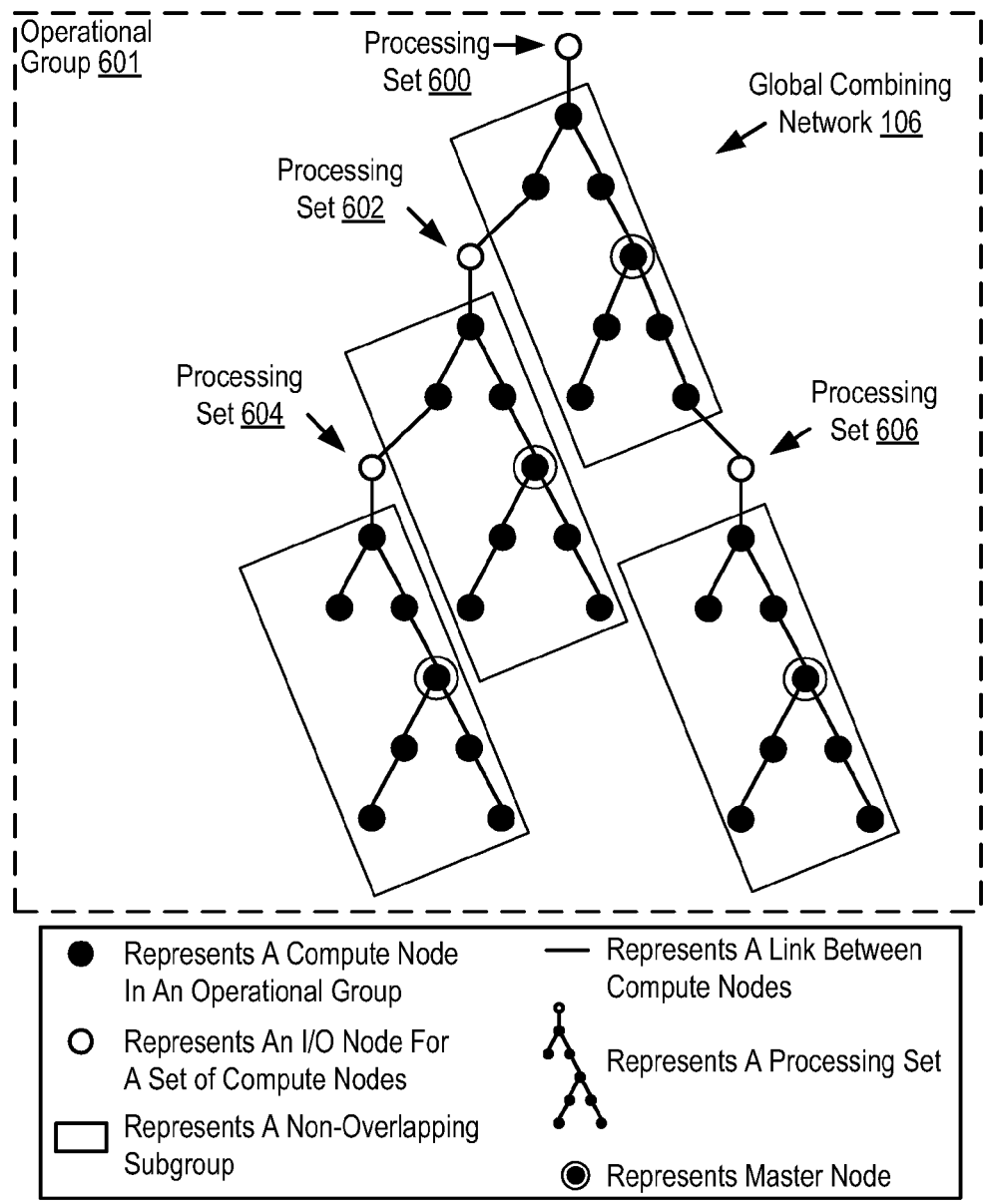
FIG. 6A sets forth a line drawing illustrating an exemplary global combining network useful in a parallel computer capable of configuring compute nodes of the parallel computer in an operational group into a plurality of independent non-overlapping collective networks according to embodiments of the present invention.

FIG. 6A sets forth a line drawing illustrating an exemplary global combining network useful in a parallel computer capable of configuring compute nodes of the parallel computer in an operational group into a plurality of independent non-overlapping collective networks according to embodiments of the present invention. The compute nodes in the example of FIG. 6A belong to the same operational group (601). In the example of FIG. 6A, the compute nodes in the operational group (601) are connected together for data communications through a global combining network (106). In addition, the compute nodes in the operational group (601) are organized into a plurality of processing sets (600, 602, 604, 606). A processing set is a set of nodes that includes one I/O node connected for data communications with any number of compute nodes. As mentioned above, an I/O node handles communications between the compute nodes in its processing set and other systems, including hosts and file servers. Each processing set in the example of FIG. 6A includes eight compute nodes and one I/O node connected together to form part of the overall global combining network (106).

In the example of FIG. 6A, the compute nodes in the operational group (601) are partitioned into a plurality of non-overlapping subgroups. The solid rectangles overlaid on the compute nodes in the example of FIG. 6A illustrate the non-overlapping subgroups into which the compute nodes are partitioned. The subgroups are non-overlapping in the sense that no two subgroups have the same compute node. To partition the compute nodes into a plurality of non-overlapping subgroups, the compute nodes for each processing set may be assigned to a non-overlapping subgroup. Assigning the compute nodes in each processing set to a subgroup ensures that the subgroups are non-overlapping because each processing set (600, 602, 604, 606) forms a different part of the global combining network (106), that is, each processing set (600, 602, 604, 606) itself is non-overlapping. In the example of FIG. 6A, the compute nodes that belong to the processing set (600) are assigned to a non-overlapping subgroup, the compute nodes that belong to the processing set (602) are assigned to a non-overlapping subgroup, the compute nodes that belong to the processing set (604) are assigned to a non-overlapping subgroup, and the compute nodes that belong to the processing set (606) are assigned to a non-overlapping subgroup.

In the example of FIG. 6A, one compute node from each of the non-overlapping subgroups is designated as a master node using a circle. A master node serves as the root node of the collective network formed from the compute nodes in a non-overlapping subgroup. The master node of a non-overlapping subgroup may be designated by selecting a compute node for the non-overlapping subgroup such that the collective network for the non-overlapping subgroup has the optimal number of tiers.

Figure 6B:
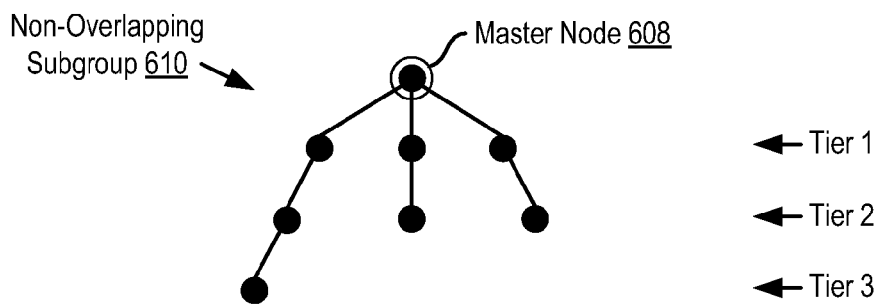
FIG. 6B sets forth a line drawing illustrating an exemplary non-overlapping subgroup useful in a parallel computer capable of configuring compute nodes of the parallel computer in an operational group into a plurality of independent non-overlapping collective networks according to embodiments of the present invention.

For further explanation of designating a master node for a non-overlapping subgroup, consider FIG. 6B that sets forth a line drawing illustrating an exemplary non-overlapping subgroup useful in a parallel computer capable of configuring compute nodes in an operational group into a plurality of independent non-overlapping collective networks according to embodiments of the present invention. In the example of FIG. 6B, the non-overlapping subgroup (610) is composed of the compute nodes in one of the processing sets illustrated in the example of FIG. 6A. A master node (608) for the non-overlapping subgroup (610) is designated by selecting a compute node for the non-overlapping subgroup (610) such that the collective network for the non-overlapping subgroup (610) has the optimal number of tiers. The number of tiers for a collective network is measured as the greatest number of links between the master node and any other compute node in the subgroup. Often the optimal number of tiers for the collective network formed from the nodes of a subgroup is the minimum number of tiers for collective network for the subgroup. Forming a collective network for the subgroup using the minimum number of tiers reduces the number of links traversed by data during a collective operation on the collective network for the subgroup.

In the example of FIG. 6B, the compute nodes for the subgroup (610) are arranged with the master node (608) as the root of the collective network capable of being formed from the nodes of the subgroup (610). The compute node designated as the master node (608) in FIG. 6B results in a collective network having three tiers. Based on the connection topology of the compute nodes in the subgroup (610), three is the minimum number of tiers for the collective network formed from the nodes in the subgroup (610). The compute nodes at the first tier have one link between themselves and the master node (608). The compute nodes at the second tier have two links between themselves and the master node (608). The compute nodes at the third tier have three links between themselves and the master node (608).

FIG. 6A illustrates an exemplary manner in which compute nodes in an operational group may be partitioned into a plurality of non-overlapping subgroups. FIG. 6B illustrates an exemplary manner in which one compute node from a non-overlapping subgroup may be designated as the master node. Turning now to illustrate an exemplary manner in which class routing instructions may be assigned to the compute nodes in a non-overlapping subgroup that organize the compute nodes in that subgroup as a collective network, consider FIG. 7A that sets forth a line drawing illustrating an exemplary collective network useful in a parallel computer capable of configuring compute nodes of the parallel computer in an operational group into a plurality of independent non-overlapping collective networks according to embodiments of the present invention.

Figure 7A:
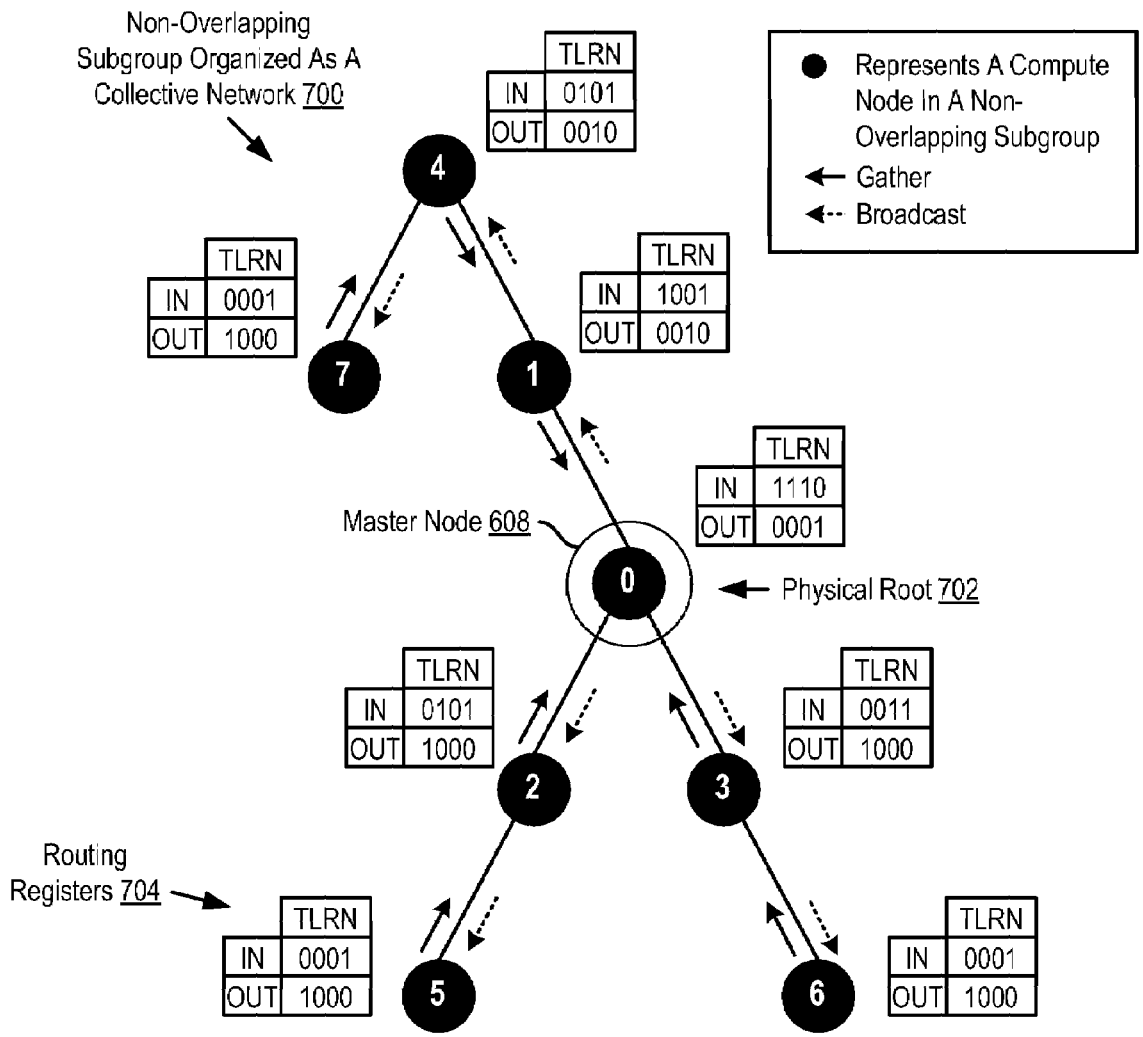
FIG. 7A sets forth a line drawing illustrating an exemplary collective network useful in a parallel computer capable of configuring compute nodes of the parallel computer in an operational group into a plurality of independent non-overlapping collective networks according to embodiments of the present invention.

FIG. 7A illustrates a non-overlapping subgroup (700) of compute nodes organized as a collective network. The non-overlapping subgroup (700) of FIG. 7A includes compute nodes '0,' '1,' '2,' '3,' '4,' '5,' '6,' and '7.' The non-overlapping subgroup (700) of compute nodes is organized as a collective network by assigning class routing instructions to each of the compute nodes in the subgroup (700). Class routing instructions specify the manner in which a compute node routes packets for a particular routing class. Using different routing instructions for different routing classes, a compute node may route different packets according to different routing instructions. For example, for one routing class, the compute nodes of the subgroup (700) may route packets specifying that routing class to the master node (608) for processing according to a collective operation. For another routing class, the compute nodes of the subgroup (700) may route packets specifying that routing class so that the packets arrive in the I/O node for the processing set to which the compute nodes belongs. Class routing instructions may be assigned to each of the compute nodes by configuring routing registers (704) for each of the compute nodes in the subgroup with the class routing instructions. In such a manner, two different routing configurations may exist among the same compute nodes on the same physical network. In the example of FIG. 7A, readers will note that the routing registers (704) for each of the compute nodes only include routing instructions for one particular routing class, which is used to organize the compute nodes of subgroup (700) as a collective network such that the master node (608) is a physical node (702). Such an example, however, is for explanation and not for limitation.

Figure 7B:
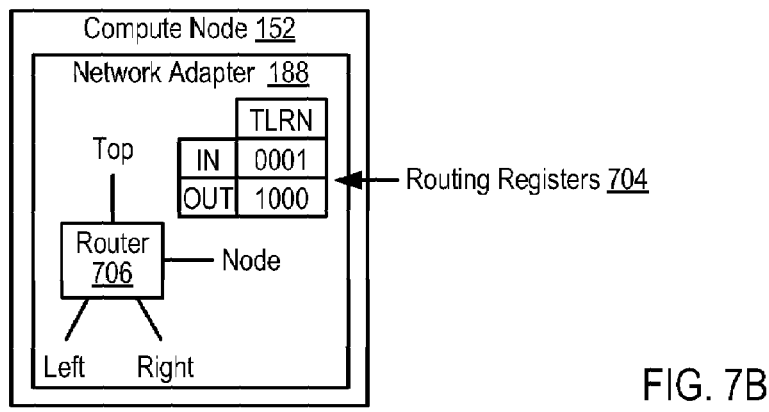
FIG. 7B sets forth a block diagram illustrating an exemplary compute node useful in a parallel computer capable of configuring compute nodes of the parallel computer in an operational group into a plurality of independent non-overlapping collective networks according to embodiments of the present invention.

To aid readers in understanding how the class routing instructions assigned to each of the compute nodes in the non-overlapping subgroup (700) organize the compute nodes as a collective network, consider FIG. 7B that sets forth a block diagram illustrating an exemplary compute node useful in a parallel computer capable of configuring compute nodes of the parallel computer in an operational group into a plurality of independent non-overlapping collective networks according to embodiments of the present invention. The compute node (152) of FIG. 7B includes a global combining network adapter (188) as described above. The network adapter (188) has a link labeled 'Top' that links the compute node (152) to its parent in a global combining network. The network adapter (188) has a link labeled 'Left' that links the compute node (152) to its child node along the left branch in the global combining tree. The network adapter (188) has a link labeled 'Right' that links the compute node (152) to its child node along the right branch in the global combining tree. The network adapter (188) also has a link labeled 'Node' that links the router to the other components (not shown) of the compute node (152) such as for example, a DMA controller, an expansion bus, a processing core, volatile memory, and so on. The global combining network adapter (188) includes two routing registers (704), one register labeled 'IN' and the other register labeled 'OUT.' Each register is four bits in size such that each bit in each register corresponds to one of the links labeled 'Top,' Left, 'Right,' or 'Node.' In the example of FIG. 7B, the first bit of each register (704) corresponds to the link labeled 'Top.' The second bit of each register (704) corresponds to the link labeled 'Left.' The third bit of each register (704) corresponds to the link labeled 'Right.' The fourth bit of each register (704) corresponds to the link labeled 'Node.'

The network adapter (188) of FIG. 7B includes a router (706) that receives packets to be routed on a global combining network that connects the compute node (152) to other compute nodes. When the router (706) of FIG. 7B receives a packet on a link, the router (706) applies a routing algorithm to determine the links along which the router (706) should forward the packet. The routing algorithm used by the router (706) in the example of FIG. 7B utilizes the routing instructions stored in the routing registers (704) of the network adapter (188). The routing algorithm operates generally as follows:

- the router (706) identifies the link on which the router (706) received a packet for routing,
- the router (706) looks up the value for the bit in the 'IN' register that corresponds to the link on which the router received the packet,
- if the bit value is zero, then the packet is forwarded on the links which correspond to the bits in the 'IN' register for which the bit value is one, and
- if the bit value is one, then the packet is forwarded on the links which correspond to the bits in the 'OUT' register for which the bit value is one.

Using the routing algorithm described above, the exemplary routing instructions configured in the routing register (704) of FIG. 7B specify forwarding a packet along the link labeled 'Node' if the packet is received on any of the links labeled 'Top,' 'Left,' or 'Right.' If the packet is received on the link labeled 'Node,' the exemplary routing instructions configured in the routing register (704) of FIG. 7B specify forwarding the packet along the link labeled 'Top' to the parent node.

Turning back to FIG. 7A, each compute node of the non-overlapping subgroup (700) is assigned routing instructions that organize the compute nodes in that non-overlapping subgroup as a collective network such that the master node (608) is a physical root (702). The physical root (702) for a collective network is the compute node that determines the final results for a collective operation and transmits those results to all of the other nodes in the collective network. In the example of FIG. 7A, each of the compute nodes '0,' '1,' '2,' '3,' '4,' '5,' '6,' and '7' provides contributions for a gather operation that matriculate to the physical root (702) as a final result. The physical root (702) then transmits the final results of the gather operation to all of the other compute nodes in the subgroup (700) using a broadcast operation. The manner in which the routing instructions are used to effect this flow of data among the compute nodes in the subgroup (700) is described below using the routing instructions illustrated in FIG. 7A and the routing algorithm described above with referenced to FIG. 7B.

When the gather operation begins, compute node '1' injects a packet containing its own contribution for the gather operation into its own router. Using the routing instructions illustrated in FIG. 7A for compute node '1,' the router for compute node '1' forwards the packet to the physical root (702) along the 'Right' link because the router received the packet from the 'Node' link. Similarly, when the gather operation begins, compute node '2' injects a packet containing its own contribution for the gather operation into its own router. Using the routing instructions illustrated in FIG. 7A for compute node '2,' the router for compute node '2' forwards the packet to the physical root (702) along the 'Top' link because the router received the packet from the 'Node' link. Also, when the gather operation begins, compute node '3' injects a packet containing its own contribution for the gather operation into its own router. Using the routing instructions illustrated in FIG. 7A for compute node '3,' the router for compute node '3' forwards the packet to the physical root (702) along the 'Top' link because the router received the packet from the 'Node' link. Upon receiving any of the packets on the 'Top,' 'Left,' or 'Right' links, the router for the physical root (702) forwards the packet to itself on the 'Node' link for processing when the last contribution is received.

Compute node '4' also injects a packet containing its own contribution for the gather operation into its own router when the gather operation begins. Using the routing instructions illustrated in FIG. 7A for compute node '4,' the router for compute node '4' forwards the packet to compute node '1' along the 'Right' link because the router received the packet from the 'Node' link. The router in compute node '1' receives the packet from compute node '4' on the 'Top' link. Using the routing instructions illustrated in FIG. 7A for compute node '1,' the router for compute node '1' forwards the packet from compute node '1' to the physical root (702) along the 'Right' link. Upon receiving the packet on the 'Top' link, the router for the physical root (702) forwards the packet to itself on the 'Node' link for processing when the last contribution is received.

When the gather operation begins, compute node '5' injects a packet containing its own contribution for the gather operation into its own router. Using the routing instructions illustrated in FIG. 7A for compute node '5,' the router for compute node '5' forwards the packet to compute node '2' along the 'Top' link because the router received the packet from the 'Node' link. The router in compute node '2' receives the packet from compute node '5' on the 'Left' link. Using the routing instructions illustrated in FIG. 7A for compute node '2,' the router for compute node '2' forwards the packet from compute node '2' to the physical root (702) along the 'Top' link. Upon receiving the packet on the 'Left' link, the router for the physical root (702) forwards the packet to itself on the 'Node' link for processing when the last contribution is received.

Compute node '6' also injects a packet containing its own contribution for the gather operation into its own router when the gather operation begins. Using the routing instructions illustrated in FIG. 7A for compute node '6,' the router for compute node '6' forwards the packet to compute node '3' along the 'Top' link because the router received the packet from the 'Node' link. The router in compute node '3' receives the packet from compute node '6' on the 'Right' link. Using the routing instructions illustrated in FIG. 7A for compute node '3,' the router for compute node '3' forwards the packet from compute node '3' to the physical root (702) along the 'Top' link. Upon receiving the packet on the 'Right' link, the router for the physical root (702) forwards the packet to itself on the 'Node' link for processing when the last contribution is received.

When the gather operation begins, compute node '7' injects a packet containing its contribution for the gather operation into its own router. Using the routing instructions illustrated in FIG. 7A for compute node '7,' the router for compute node '7' forwards the packet to compute node '4' along the 'Top' link because the router received the packet from the 'Node' link. The router in compute node '4' receives the packet from compute node '7' on the 'Left' link. Using the routing instructions illustrated in FIG. 7A for compute node '4,' the router for compute node '4' forwards the packet from compute node '7' to compute node '1' along the 'Right' link. The router in compute node '1' receives the packet from compute node '4' on the 'Top' link. Using the routing instructions illustrated in FIG. 7A for compute node '1,' the router for compute node '1' forwards the packet from compute node '4' to the physical root (702) along the 'Right' link. Upon receiving the packet on the 'Top' link, the router for the physical root (702) forwards the packet to itself on the 'Node' link for processing when the last contribution is received.

After all of the contributions for the gather operation have propagated to the physical root (702) through the collective network, the physical root (702) broadcasts the final results to each of the other compute nodes in the non-overlapping subgroup (700) by injecting a packet containing the final result into its own router. Using the routing instructions illustrated in FIG. 7A for the physical root (702), the router for the physical root (702) forwards the packet to compute nodes '1,' '2,' and '3' along the 'Top' link, 'the 'Left' link, and the 'Right' link respectively. The router in compute node '1' receives the packet from the physical root (702) on the 'Right' link. Using the routing instructions illustrated in FIG. 7A for compute node '1,' the router for compute node '1' forwards the packet from the physical root (702) to itself on the 'Node' link and to compute node '4' on the 'Top' link. The router in compute node '4' receives the packet from the compute node '1' on the 'Right' link. Using the routing instructions illustrated in FIG. 7A for compute node '4,' the router for compute node '4' forwards the packet to itself on the 'Node' link and to compute node '7' on the 'Left' link. The router in compute node '7' receives the packet from the compute node '4' on the 'Top' link. Using the routing instructions illustrated in FIG. 7A for compute node '7,' the router for compute node '7' forwards the packet to itself on the 'Node' link. At this point, compute nodes '0,' '1,' '4,' and '7' have received the final results of the gather operation.

When the router in compute node '2' receives the packet from the physical root (702), the packet is received on the 'Top' link. Using the routing instructions illustrated in FIG. 7A for compute node '2,' the router for compute node '2' forwards the packet from the physical root (702) to itself on the 'Node' link and to compute node '5' on the 'Left' link. The router in compute node '5' receives the packet from the compute node '2' on the 'Top' link. Using the routing instructions illustrated in FIG. 7A for compute node '5,' the router for compute node '5' forwards the packet to itself on the 'Node' link. At this point, compute nodes '2' and '5' have received the final results of the gather operation.

When the router in compute node '3' receives the packet from the physical root (702), the packet is received on the 'Top' link. Using the routing instructions illustrated in FIG. 7A for compute node '3,' the router for compute node '3' forwards the packet from the physical root (702) to itself on the 'Node' link and to compute node '6' on the 'Right' link. The router in compute node '6' receives the packet from the compute node '3' on the 'Top' link. Using the routing instructions illustrated in FIG. 7A for compute node '6,' the router for compute node '6' forwards the packet to itself on the 'Node' link. At this point, compute nodes '3' and '6' have received the final results of the gather operation.

Readers will note that configuring the routing registers (704) for each of the compute nodes in the subgroup (700) with the class routing instructions as described above allows the master node (608) to operate as a physical root (702) for the collective network for the non-overlapping subgroup (700) because the packet data flows from all of the compute nodes in the subgroup (700) to the master node (608) and then back out to all of the other compute nodes. Readers will further note that the collective network organized from the compute node in the non-overlapping subgroup (700) may perform collective operations independently of collective networks for other non-overlapping subgroups for the same operational group because none of the compute nodes in the subgroup (700) are included in any other non-overlapping subgroups.

Figure 8:
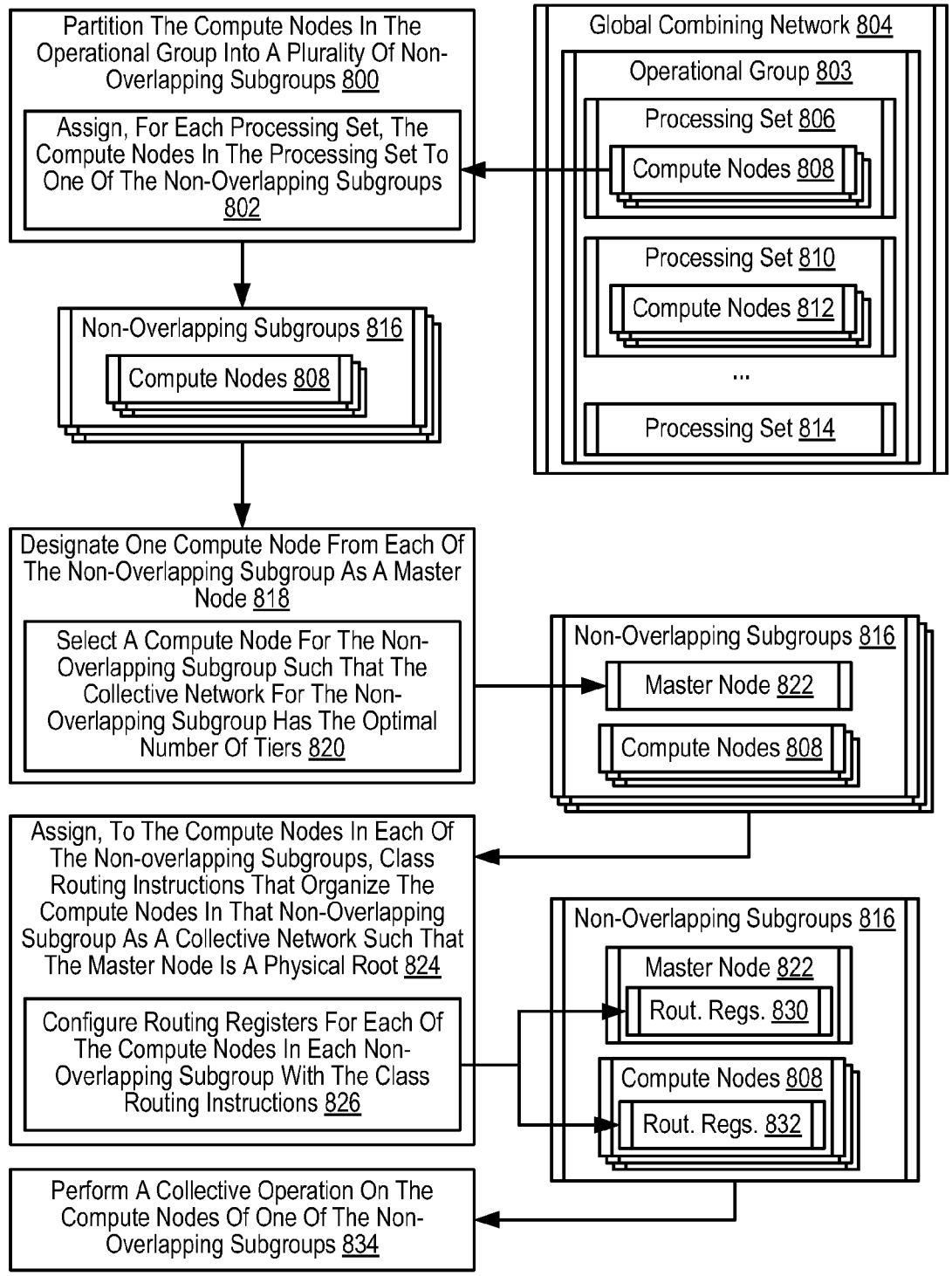
FIG. 8 sets forth a flow chart illustrating an exemplary method for configuring compute nodes of a parallel computer in an operational group into a plurality of independent non-overlapping collective networks according to the present invention.

For further explanation, FIG. 8 sets forth a flow chart illustrating an exemplary method for configuring compute nodes (808, 812) of a parallel computer in an operational group (803) into a plurality of independent non-overlapping collective networks according to the present invention. The compute nodes (808, 812) in the operational group (803) of FIG. 8 are connected together for data communications through a global combining network (804) and are organized into a plurality of processing sets (806, 810, 814). As mentioned above, a processing set is a set of nodes that includes one I/O node connected for data communications with any number of compute nodes. As mentioned above, an I/O node handles communications between the compute nodes in its processing set and other systems, including hosts and file servers.

The method of FIG. 8 includes partitioning (800) the compute nodes (808, 812) in the operational group (803) into a plurality of non-overlapping subgroups (816). Partitioning (800) the compute nodes (808, 812) in the operational group (803) into a plurality of non-overlapping subgroups (816) according to the method of FIG. 8 may be carried out by a service node of the parallel computer or by each of the compute nodes themselves. Partitioning (800) the compute nodes (808, 812) in the operational group (803) into a plurality of non-overlapping subgroups (816) according to the method of FIG. 8 includes assigning (802), for each processing set (806, 810, 814), the compute nodes in the processing set to one of the non-overlapping subgroups (816). The subgroups are referred to as non-overlapping in the sense that no two subgroups have the same compute node. Because a compute node typically belongs to only one processing set, assigning the compute nodes in each processing set to a subgroup ensures that the subgroups are non-overlapping.

The method of FIG. 8 also includes designating (818) one compute node from each of the non-overlapping subgroups (816) as a master node (822). Designating (818) one compute node from each of the non-overlapping subgroups (816) as a master node (822) according to the method of FIG. 8 may be carried out by a service node of the parallel computer or by each of the compute nodes themselves. Designating (818) one compute node from each of the non-overlapping subgroups (816) as a master node (822) according to the method of FIG. 8 includes selecting (820) a compute node for the non-overlapping subgroup such that the collective network for the non-overlapping subgroup (816) has the optimal number of tiers. The number of tiers for a collective network is measured as the greatest number of links between the master node and any other compute node in the subgroup. Often the optimal number of tiers for the collective network formed from the nodes of a subgroup is the minimum number of tiers for collective network for the subgroup. Forming a collective network for the subgroup using the minimum number of tiers reduces the number of links traversed by data during a collective operation on the collective network for the subgroup.

The method of FIG. 8 includes assigning (824), to the compute nodes in each of the non-overlapping subgroups (816), class routing instructions that organize the compute nodes (808, 822) in that non-overlapping subgroup (816) as a collective network such that the master node (822) is a physical root. Assigning (824) class routing instructions that organize the compute nodes (808, 822) in that non-overlapping subgroup (816) as a collective network according to the method of FIG. 8 may be carried out by a service node of the parallel computer or by each of the compute nodes themselves. Assigning (824) class routing instructions that organize the compute nodes (808, 822) in that non-overlapping subgroup (816) as a collective network according to the method of FIG. 8 includes configuring (826) routing registers (830, 832) for each of the compute nodes (808, 822) in each non-overlapping subgroup with the class routing instructions. Class routing instructions specify the manner in which a compute node routes packets for a particular routing class. Using different routing instructions for different routing classes, a compute node may route different packets according to different routing instructions. For example, for one routing class, the compute nodes of the subgroup may route packets specifying that routing class to the master node for processing according to a collective operation. For another routing class, the compute nodes of the subgroup may route packets specifying that routing class so that the packets arrive in the I/O node for the processing set to which the compute nodes belongs.

The method of FIG. 8 also includes performing (834) a collective operation on the compute nodes of one of the non-overlapping subgroups (816). Performing (834) a collective operation on the compute nodes of one of the non-overlapping subgroups (816) according to the method of FIG. 8 may be carried out by each compute node of one of the non-overlapping subgroups (816). Each compute node may perform (834) a collective operation according to the method of FIG. 8 by injecting contribution data for the collective operation onto the collective network for the subgroup in packets that specify a particular routing class, routing all packets having the particular routing class to the physical root of the collective network according to each node's routing instructions, receiving packets containing the final results of the collective operation that specify the particular routing class, and routing the final results packets to each of the nodes in the subgroup according to each node's routing instructions.

Exemplary embodiments of the present invention are described largely in the context of a fully functional computer system for configuring compute nodes of a parallel computer in an operational group into a plurality of independent non-overlapping collective networks. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for configuring compute nodes of a parallel computer in an operational group into a plurality of independent non-overlapping collective networks, the compute nodes in the operational group connected together for data communications through a global combining network, the method comprising:
   partitioning the compute nodes in the operational group into a plurality of non-overlapping subgroups;
   designating one compute node from each of the non-overlapping subgroups as a master node; and
   assigning, to the compute nodes in each of the non-overlapping subgroups, class routing instructions that organize the compute nodes in that non-overlapping subgroup as a collective network such that the master node within the non-overlapping subgroup is a physical root.

2. The method of claim 1 wherein assigning, to the compute nodes in each of the non-overlapping subgroups, class routing instructions that organize the compute nodes in that non-overlapping subgroup as a collective network further comprises configuring routing registers for each of the compute nodes in each non-overlapping subgroup with the class routing instructions.

3. The method of claim 1 wherein:
   the compute nodes in the operational group are organized into a plurality of processing sets; and
   partitioning the compute nodes in the operational group into a plurality of non-overlapping subgroups further comprises assigning, for each processing set, the compute nodes in the processing set to one of the non-overlapping subgroups.

4. The method of claim 1 wherein designating one compute node from each of the non-overlapping subgroups as a master node further comprises selecting a compute node for the non-overlapping subgroup such that the collective network for the non-overlapping subgroup has the optimal number of tiers.

5. The method of claim 1 further comprising performing a collective operation on the compute nodes of one of the non-overlapping subgroups.

6. The method of claim 1 wherein the parallel computer comprises a plurality of compute nodes connected for data communications through a plurality of data communications networks, at least one of the data communications networks optimized for point to point data communications, and at least one of the data communications networks optimized for collective operations.

7. A parallel computer for configuring compute nodes in an operational group into a plurality of independent non-overlapping collective networks, the compute nodes in the operational group connected together for data communications through a global combining network, the parallel computer comprising a service node, the service node comprising a computer processor and computer memory operatively coupled to the computer processor, the computer memory having disposed within it computer program instructions capable of:
   partitioning the compute nodes in the operational group into a plurality of non-overlapping subgroups;
   designating one compute node from each of the non-overlapping subgroups as a master node; and
   assigning, to the compute nodes in each of the non-overlapping subgroups, class routing instructions that organize the compute nodes in that non-overlapping subgroup as a collective network such that the master node within the non-overlapping subgroup is a physical root.

8. The parallel computer of claim 7 wherein assigning, to the compute nodes in each of the non-overlapping subgroups, class routing instructions that organize the compute nodes in that non-overlapping subgroup as a collective network further comprises configuring routing registers for each of the compute nodes in each non-overlapping subgroup with the class routing instructions.

9. The parallel computer of claim 7 wherein:
   the compute nodes in the operational group are organized into a plurality of processing sets; and
   partitioning the compute nodes in the operational group into a plurality of non-overlapping subgroups further comprises assigning, for each processing set, the compute nodes in the processing set to one of the non-overlapping subgroups.

10. The parallel computer of claim 7 wherein designating one compute node from each of the non-overlapping subgroups as a master node further comprises selecting a compute node for the non-overlapping subgroup such that the collective network for the non-overlapping subgroup has the optimal number of tiers.

11. The parallel computer of claim 7 wherein each compute node has disposed within it computer program instructions capable of performing a collective operation on the compute nodes of one of the non-overlapping subgroups.

12. The parallel computer of claim 7 wherein the parallel computer comprises a plurality of compute nodes connected for data communications through a plurality of data communications networks, at least one of the data communications networks optimized for point to point data communications, and at least one of the data communications networks optimized for collective operations.

13. A computer program product for configuring compute nodes of a parallel computer in an operational group into a plurality of independent non-overlapping collective networks, the compute nodes in the operational group connected together for data communications through a global combining network, the computer program product disposed upon a computer readable recordable medium, the computer program product comprising computer program instructions capable of: partitioning the compute nodes in the operational group into a plurality of non-overlapping subgroups;

designating one compute node from each of the non-overlapping subgroups as a master node; and assigning, to the compute nodes in each of the non-overlapping subgroups, class routing instructions that organize the compute nodes in that non-overlapping subgroup as a collective network such that the master node within the non-overlapping subgroup is a physical root.

14. The computer program product of claim 13 wherein assigning, to the compute nodes in each of the non-overlapping subgroups, class routing instructions that organize the compute nodes in that non-overlapping subgroup as a collective network further comprises configuring routing registers for each of the compute nodes in each non-overlapping subgroup with the class routing instructions.

15. The computer program product of claim 13 wherein:
the compute nodes in the operational group are organized into a plurality of processing sets; and
partitioning the compute nodes in the operational group into a plurality of non-overlapping subgroups further comprises assigning, for each processing set, the compute nodes in the processing set to one of the non-overlapping subgroups.

16. The computer program product of claim 13 wherein designating one compute node from each of the non-overlapping subgroups as a master node further comprises selecting a compute node for the non-overlapping subgroup such that the collective network for the non-overlapping subgroup has the optimal number of tiers.

17. The computer program product of claim 13 further comprising computer program instructions capable of performing a collective operation on the compute nodes of one of the non-overlapping subgroups.

18. The computer program product of claim 13 wherein the parallel computer comprises a plurality of compute nodes connected for data communications through a plurality of data communications networks, at least one of the data communications networks optimized for point to point data communications, and at least one of the data communications networks optimized for collective operations.

* * * * *